(12) United States Patent
Greco

(10) Patent No.: US 9,062,649 B2
(45) Date of Patent: Jun. 23, 2015

(54) DEVICE FOR CONVERSION OF MECHANICAL ENERGY FROM SEA WAVES TO ELECTRIC ENERGY

(71) Applicant: ENSEA S.R.L.

(72) Inventor: Paolo Greco, Parabita (IT)

( * ) Notice: Subject to any disclaimer, the term of this patent is extended or adjusted under 35 U.S.C. 154(b) by 0 days.

(21) Appl. No.: 14/356,161

(22) PCT Filed: Nov. 1, 2012

(86) PCT No.: PCT/EP2012/071672
§ 371 (c)(1),
(2) Date: May 4, 2014

(87) PCT Pub. No.: WO2013/064607
PCT Pub. Date: May 10, 2013

(65) Prior Publication Data
US 2015/0021918 A1    Jan. 22, 2015

(30) Foreign Application Priority Data
Nov. 4, 2011 (IT) .............................. RM2011A0581

(51) Int. Cl.
*F03B 13/10* (2006.01)
*F03B 13/12* (2006.01)
*H02P 9/04* (2006.01)
*F03B 13/18* (2006.01)
*F28F 27/02* (2006.01)
(Continued)

(52) U.S. Cl.
CPC ............. *F03B 13/18* (2013.01); *F03B 13/1815* (2013.01); *F03B 13/1885* (2013.01); *Y02E 10/38* (2013.01); *F28F 27/02* (2013.01); *F28D 7/16* (2013.01); *F03B 13/10* (2013.01)

(58) Field of Classification Search
USPC ................................................ 290/53; 60/495
See application file for complete search history.

(56) References Cited

U.S. PATENT DOCUMENTS 4,076,463 A * 2/1978 Welczer ......................... 417/331
4,208,877 A   6/1980 Evans et al. ..................... 60/495
4,228,360 A * 10/1980 Navarro ........................... 290/43
(Continued)

FOREIGN PATENT DOCUMENTS

WO    2007/086750 A1    8/2007

*Primary Examiner* — Pedro J Cuevas
(74) *Attorney, Agent, or Firm* — Oppenhuizen Law PLC; David L. Oppenhuizen

(57) ABSTRACT

Device (100) for conversion of mechanical energy from sea waves to electric energy, characterized by:—at least a float (101) and two rigid rods (102), (103), preferably anchored at one end to the seabed (108), and at the other end to the float (101) through flexible cables (106), (107); two respective masses (104), (105) keep the free ends of that rods (102), (103), constantly in traction condition pulled towards the sea bed (108);—at least a power generator (109), or other similar device suitable to convert and/or transmit energy, that is placed close to its respective hinge (110), (111), placed at the bottom parts of the rods (102), (103), so that the oscillatory motion of the float (101), following the waves level (112), causes a force with a vertical component that leads to a rotatory and oscillatory motion of the rods (102), (103), which are pivoted on its respective hinge (110), (111), and generates therefore electric energy by motion of gears of the same generator (109); the horizontal component of the force due to the float (101) oscillations is balanced by a system of counterweights, so that the same float (101) tends to place itself constantly on vertical line A-A'.

10 Claims, 5 Drawing Sheets

(51) Int. Cl.
　　　*F28D 7/16*　　　(2006.01)
　　　*F03B 17/02*　　(2006.01)

(56) References Cited

U.S. PATENT DOCUMENTS

| | | | | |
|---|---|---|---|---|
| 4,781,023 A * | 11/1988 | Gordon | | 60/506 |
| 5,066,867 A | 11/1991 | Shim | | 290/53 |
| 5,808,368 A | 9/1998 | Brown | | 290/53 |
| 6,756,695 B2 | 6/2004 | Hibbs | | 290/42 |
| 6,930,406 B2 * | 8/2005 | Montgomery | | 290/42 |
| 7,444,810 B2 * | 11/2008 | Olson | | 60/495 |
| 7,845,880 B2 | 12/2010 | Rasmussen | | 405/76 |
| 7,930,885 B2 * | 4/2011 | Brown | | 60/504 |
| 8,049,356 B2 * | 11/2011 | Chervin et al. | | 290/53 |
| 8,581,433 B2 * | 11/2013 | Sidenmark | | 290/53 |
| 8,667,791 B2 * | 3/2014 | McEvoy et al. | | 60/497 |
| 8,823,196 B1 * | 9/2014 | Gehring | | 290/53 |
| 8,901,766 B2 * | 12/2014 | Werjefelt | | 290/53 |
| 2008/0197631 A1 * | 8/2008 | Atilano Medina et al. | | 290/42 |
| 2010/0045044 A1 * | 2/2010 | Patterson | | 290/53 |
| 2014/0117671 A1 * | 5/2014 | Gregory | | 290/53 |

* cited by examiner

DEVICE FOR CONVERSION OF MECHANICAL ENERGY FROM SEA WAVES TO ELECTRIC ENERGY

The present invention concerns a device for conversion of mechanical energy from sea waves to electric energy, that comprises a float following the level of sea waves and transmitting its motion to rigid rods anchored to the seabed. The rotary and oscillatory motion of rigid rods, in respect to a reference hinge, causes the motion of the gears of an electric power generator, or the push of a fluid under pressure within an hydraulic circuit, able in its turn to set in motion the gears of an electric power generator placed at a given distance, for instance on shore. The same device can comprise heat exchangers, used to transmit the thermal sea energy for a given distance, using that hydraulic circuit in which the internal fluid, at first, acquires heat from sea and, successively, it is pushed at a distance where it releases heat to an external user that is placed for instance on shore.

In the prior art some solutions are known that use energy from motion of sea waves to activate some electric power generators.

The patent of the United States of America U.S. Pat. No. 4,208,877 (Evans et al.) describes a submerged cylinder which is connected through cables to two elements fixed to the seabed. The motion of the cylinder, due to the waves action, causes the cables oscillations that are connected to the electric power generators. These generators can be placed at anchorage points on the seabed, or at points jointed to the cylinder. Therefore, this device comprises a floating element anchored to the seabed, with a power generator activated by oscillations of float. However, the same device has a very low efficiency of energy conversion, because it doesn't include rigid rods, neither a system of counterweights, and it doesn't generate a configuration of forces able to optimize the conversion from mechanical energy to electric energy.

The patent of the United States of America U.S. Pat. No. 6,756,695 (Hibbs et al.) regards a floating structure that is kept slightly below the surface of sea, and it is anchored at least with two points on the same seabed through connecting cables. The motion of the structure on the horizontal plane allows the activation of a rotor or gears belonging to a power generator, that is placed close to the same submerged floating structure. In this case either, the device includes a floating element fixed to the seabed; however oscillations suitable for energy conversion are just those on the horizontal plane and, considering that the generator is placed directly on the float, it results to have a very low efficiency of energy conversion, and at the same time a relevant exposition to possible bad weather conditions.

The patent of the United States of America U.S. Pat. No. 7,845,880 (Rasmussen) concerns another structure consisting of a float located on the sea surface, a middle element fixed to a ballast and two moorings that keep the middle element tied to the same vertical line. The waves motion wings the float along the vertical direction, so that it tends to lift the middle element to which it is connected in depth. A gear, placed on the same middle element, tends to oscillate with a rotary movement in respect to a pivot, this movement being balanced by a counterweight, thereby charging a generator installed on the same middle element. Further in this case, the device comprises a floating element tied to the seabed, with a power generator activated by oscillations of a float. However the same device has a very low efficiency of energy conversion, because it doesn't provide some rigid rods, and it doesn't define a configuration of forces able to optimize the conversion from mechanical energy to electric energy. Therefore, the main objective of the present invention is to propose a device for the conversion of mechanical energy from sea waves energy to electric energy.

Another target is that the same device has to provide a stable steady equilibrium point so that the horizontal and vertical oscillations, referred to that equilibrium point, allow to activate a generator of electric power.

A further objective is that the same device could be installed in shallow water or, as an alternative, in deep water.

Another aim is that the same device could be part of a modular system that allows to produce an amount of energy proportional to sea surface involved by the devices, or proportional to the number of installed modules.

Another further target is that the same device allows the integration of a system for the extraction of thermal energy from the sea water, wherein the sea water pushed on shore is stored or transported to an heat exchanger before to be returned to the sea, in order to achieve an heating or cooling process through heat pumps.

Therefore, it is specific subject of the present invention a device for the conversion of mechanical energy from sea waves to electric energy, characterized by:

at least a float and two rigid rods preferably anchored at one end to the seabed, and at the other end to the float through flexible cables; two respective masses keep the free ends of the rods constantly in traction condition pulled in direction and towards the sea bed;

at least a power generator, or other similar device suitable to convert and/or transmit energy, that is placed close to a respective hinge, placed at the bottom parts of the rods, so that the oscillatory motion of the float, following the waves level, causes a force with a vertical component that leads to a rotatory and oscillatory motion of the rods referring to the respective hinges, and generates therefore electric energy by the motion of gears of the same generator; the horizontal component of the float oscillations is balanced by a system of counterweights, so that the same float tends to place itself constantly on vertical line A-A'.

The present invention will now be described by way of illustration but not limitation, according to its preferred embodiments, with particular reference to figures of the enclosed drawings, wherein.

It is here underlined that, in the following, only some of the many conceivable embodiments of the present invention will be described, and that they are just some particular examples that do not introduce any limitations, having the possibility to describe many other embodiment based on the disclosed technical solutions of the present invention.

Figure 1:
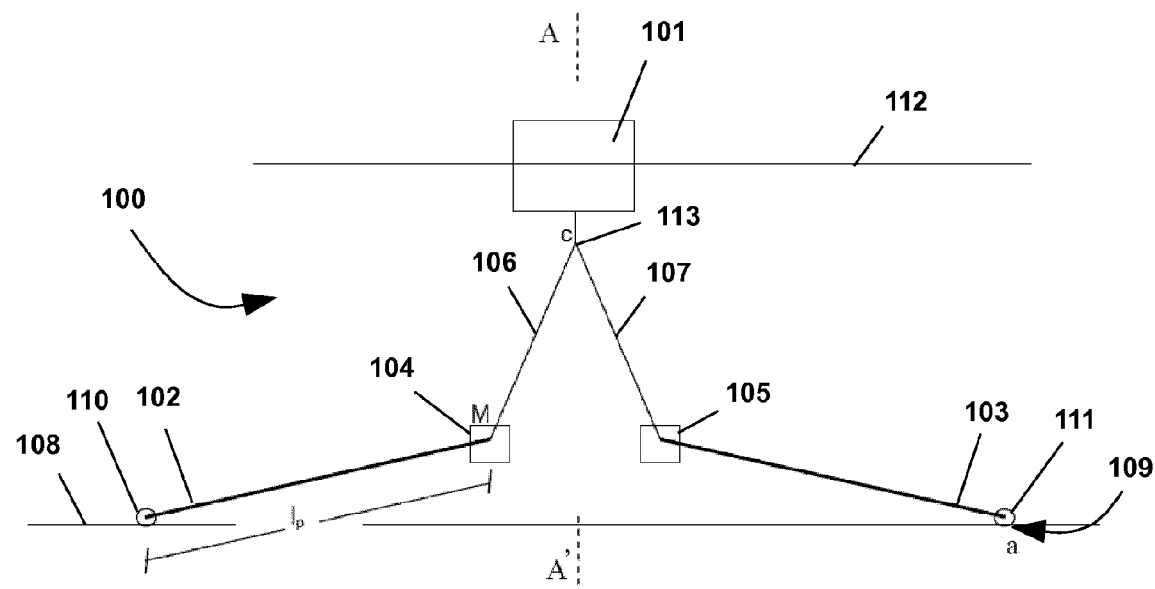
FIG. 1 is a schematic lateral view of the device, according to the present invention, comprising a float and two rigid rods anchored at one end on the seabed.

With reference to FIG. 1, device 100 for conversion of mechanical energy of sea waves to electric energy comprises: a float 101, placed on surface of sea 112; two rigid rods 102, 103, of length lp, installed in a symmetrical position in respect to vertical axis A-A', crossing through float 101, and tied to seabed 108 at the respective points 110, 111; two masses M 104, 105, one for each of rods 102, 103, placed at respective ends, at distance lp from seabed 108; two connecting cables 106, 107, jointed to respective rods 102, 103, and float 101, at point "c" 113.

Energy Production Associated to Vertical Oscillations

Figure 2:
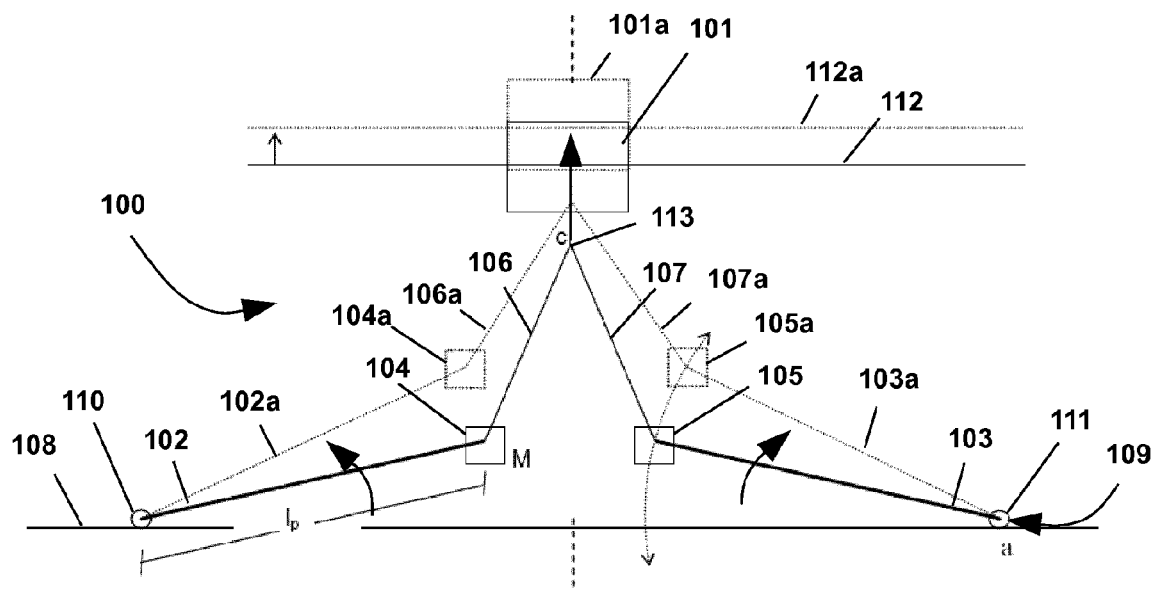
FIG. 2 is a schematic lateral view of the same device of FIG. 1, in which rods of the structure follow a rotation around their anchorage point on the seabed, as a consequence of a change of level of the float.

With reference to FIG. 2, an electric power generator 109 is installed close to Hinge "a" 111. Hinge "a" 111 is tied to seabed 108, and float 101, cables 106, 107, masses M 104, 105, and rods 102, 103, can move as a consequence of a variation of sea level 112, that moves float 101 and the other parts that are connected to it. The power generator 109 is placed close to pivot "a" 111 and it is activated by a relative motion between rod 103 and hinge 111 that is tied to the seabed 108.

Device 100 in a static configuration, when there is no motion of the sea surface 112, shows a stable equilibrium condition so that float 101 supports masses M 104, 105, as well as rods 102, 103. Cables 106, 107, and rods 102, 103, are always in traction condition.

Generator 109 begins to produce energy when the surface 112a begins to move from the average sea level 112 and drags the float 101 and the moving parts of device 100. However, amplitude of motion of float 101 is not the same as that of the sea, and it shows a delay of phase from it. In fact, the whole system opposes itself to the motion, either when energy has an electric nature or when energy has an hydraulic nature. Said part of energy to be extracted from the system, the masses, the size of the same float as well, as the size of rods and cables, are design parameters determining the whole dynamics of the system and the amount of produced energy. The optimization of those parameters allows to adapt the system to different sea conditions according to specific locations.

Geometry of Device

Figure 3:
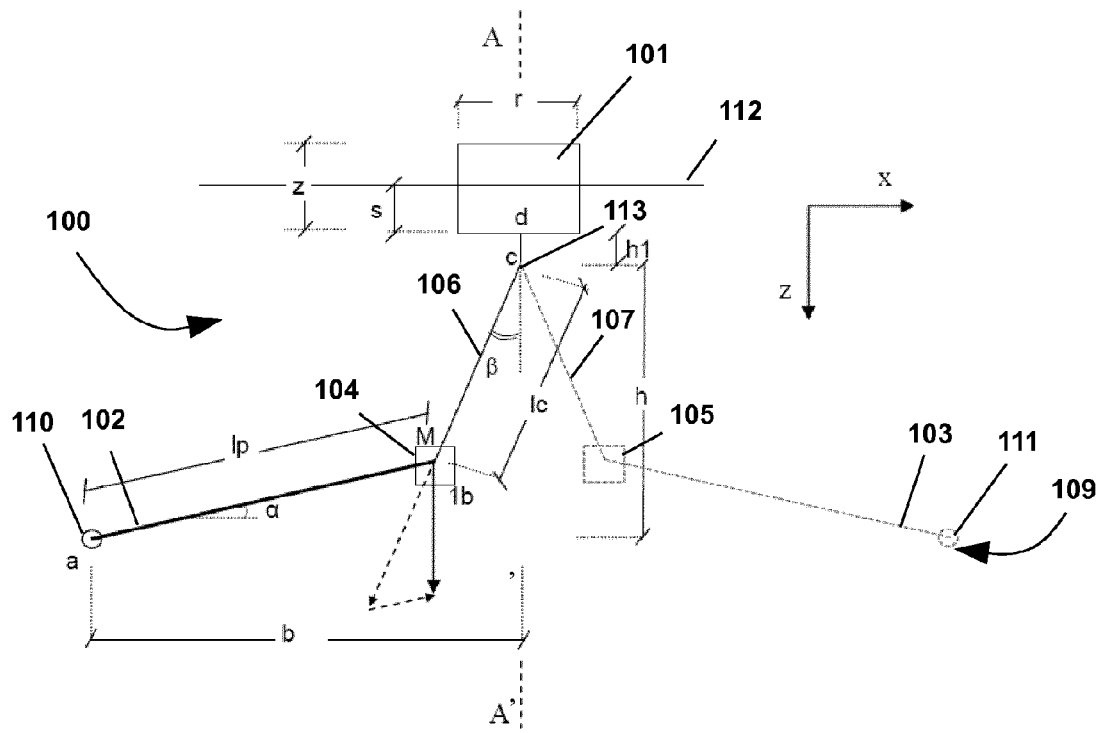
FIG. 3 is a schematic lateral view of the same device of FIG. 1, where are shown sizes of each components.

With reference to FIG. 3, float 101 is in a position of equilibrium defined by the following distances:
- s: submerged part of float 101; z, r: total height and width of the same float 101;
- h: total distance of hinge 110 from the static steady position;
- $l_P$: distance between hinge 110 and mass M 104, or total length of rod 102;
- $l_C$, $h_1$: distance of cables connecting mass M 104 to the float 101.

Angles shown in FIG. 3 are a consequence of those measures. Device 100 has both a geometric symmetry and symmetry of forces in respect to axis A-A'.

Energy Production Associated to Horizontal Oscillations

Figure 4:
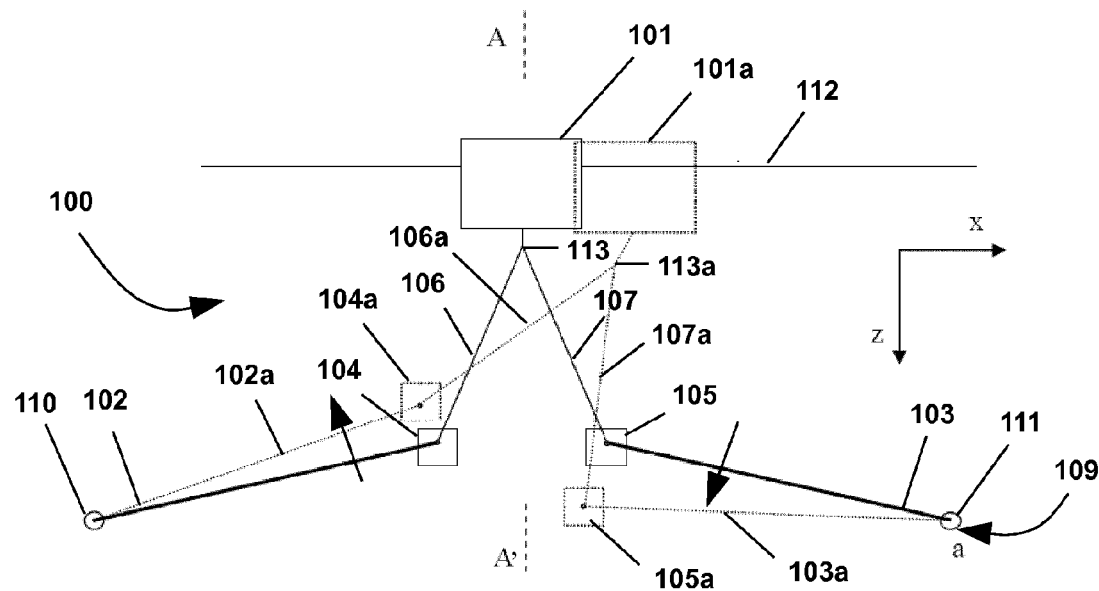
FIG. 4 is a schematic lateral view of the same device of FIG. 1, in which the components follow a shift due to an horizontal force acting on the float.

As shown in FIG. 4, a motion occurred along the horizontal direction X determine the arise of a force that tends to return the float to the starting point. For example, a motion of float 101 to the right increases the force driving both cable 106 and left rod 102, decreasing at the same time the force driving cable 107 and right rod 103, with a consequent effect along the X direction that tends to return rods 102, 103 at their starting steady position with respect to axis A-A'. A possible displacement of float 101 along the direction X causes also the lifting of one rod and the lowering of the other one, and therefore a motion that conducts to energy production, both for the left system and the right system.

Figure 5:
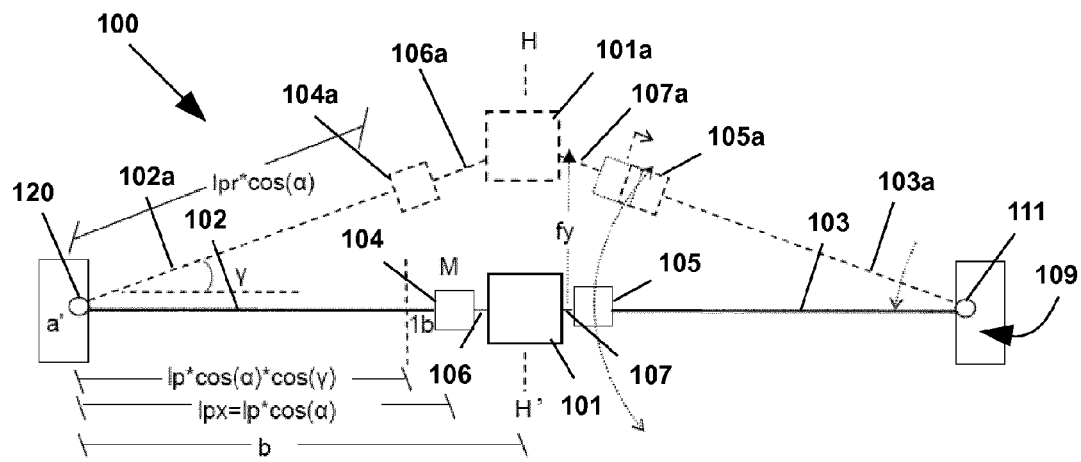
FIG. 5 is a schematic top view of the same device of FIG. 1, in which the components follow a shift caused by an horizontal force acting on the float.

FIG. 5 is a top view of displacement of float 101 in respect to a starting equilibrium position, as a consequence of an external action, for example a wave or a sea current. Device 100 includes a secondary hinge a' 120 able to let the same rod 102 to rotate on the horizontal plane x-y, so that any transversal action is avoided in the connection between primary hinge and rod 102, as a consequence of a possible force going along the y direction. The position indicated by continuous line in FIG. 5 represents the equilibrium position of device 100.

A displacement $f_y$ of float 101 along the direction H-H' causes a displacement of all the other elements (dot lines of FIG. 5). This displacement represents a forces configuration that is not in a stable equilibrium condition, because it increases the intensity of two actions along the line a'-1b, with a resulting effect of an action along y direction that tends to return device 100 to the starting position. Even in this case, the possible displacement of float 101 causes the lifting of one rod and the lowering of the other one, and therefore a motion that conducts to energy production, both for the left system and right system. Even from this position device 100 tends to return to the starting position and to produce energy, both during the motion, when the gears show resistance during energy production, and in the following step of return to the equilibrium position.

All things considered, the equilibrium position in static conditions (as absence of actions) represents an absolute equilibrium condition (having the lowest potential energy), and any displacement from that position that could be determined by a variation of sea level or a sea current causes a motion of moving parts of device 100, allowing the process of energy production, both during phase of motion and in the following step of return to the equilibrium position.

Embodiment of the Invention in Shallow Water

Figure 6:
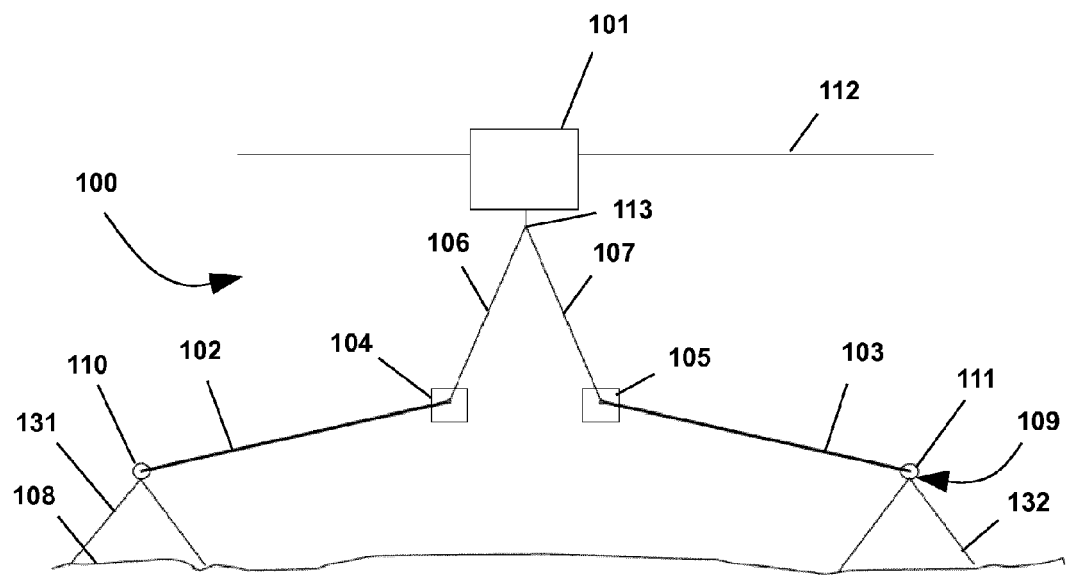
FIG. 6 is a schematic lateral view of device, according to the present invention, in an embodiment suitable to be installed in shallow water.

In FIG. 6 it is represented an example of installation in shallow water, approximately 10-20 m of depth. Either in this case, the position of hinges 110 and 111 must be fixed to the seabed 108, and the fixing elements have to resist to actions trying to move the hinges 110 and 111 closer each other.

In shallow water, the apparatus composed by generator 109 and pivot 111 can lay directly on the seabed 108, for instance using an adaptable trestle 132, and the position is fixed on the seabed using a system of cables and anchorages, in order to resist to actions trying to lift up the whole system.

Embodiment of the Invention at Deep Waters

Figure 7:
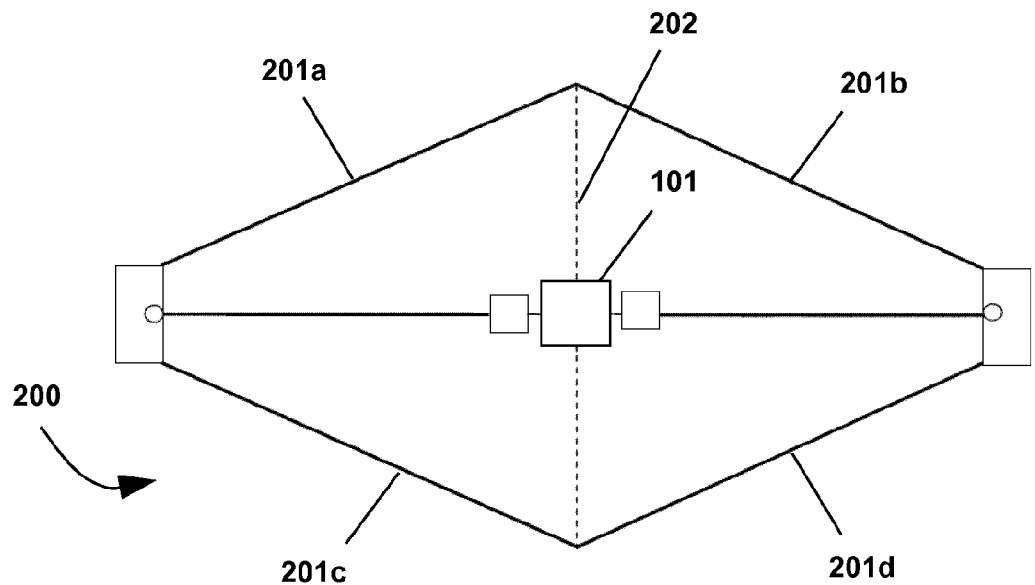
FIG. 7 is a schematic top view of device according to the present invention, in an embodiment suitable to be installed in deep water.
Figure 8:
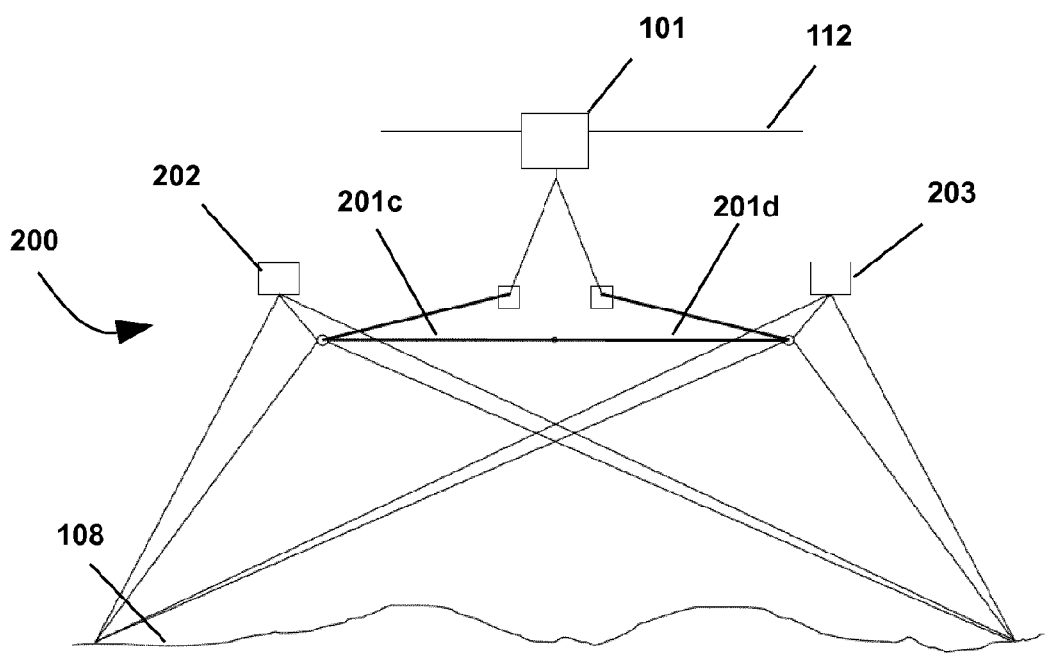
FIG. 8 is a schematic lateral view of the same device of FIG. 7, in an embodiment suitable to be installed in deep waters.

In FIGS. 7 and 8 it is represented, in a schematic top view and in a lateral view, an example of installation in deep water, typically more than 20 m of depth. In these cases the structure includes:
- a system of rods and cables suitable to avoid that the two hinges can get closer each other, and the left side get in contact with the right side;
- a system of cables for anchorage to the sea bed;
- a float, suitable to keep the system at the working level, even when position of mass M reaches a lower level in respect to that of the related hinge and generator; in fact, in such a condition the component of the weight force of the system results to be along the down direction, with the float having a size big enough to support the weight of said generator and hinge, and being capable of being not affected by the dynamic components of the vertical actions.

Again in FIGS. 7 and 8 it is presented the system 200 with a connection between right side and left side by using rods 201a, 201b, 201c, 201d, anchorage means, and additional floats 202, 203, to be used in case of installation in deep water.

Modular Embodiment

Figure 9:
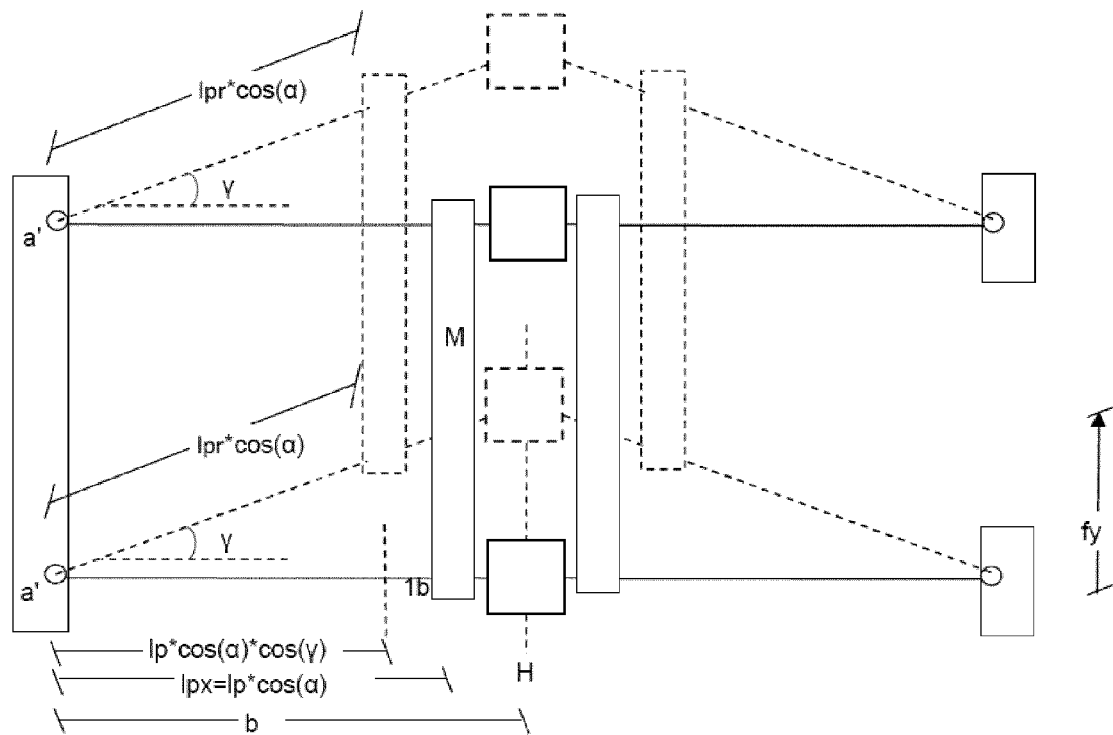
FIG. 9 is a schematic top view of a modular structure comprising more devices like that one of FIG. 1, in which the floats are connected in sequence.

In FIG. 9 it is presented an example of installation including more elements, one following the other, where each single module is represented by one of the above described devices 100. In this case the amount of energy generated is proportional to the sea surface involved by the devices.

Figure 10:
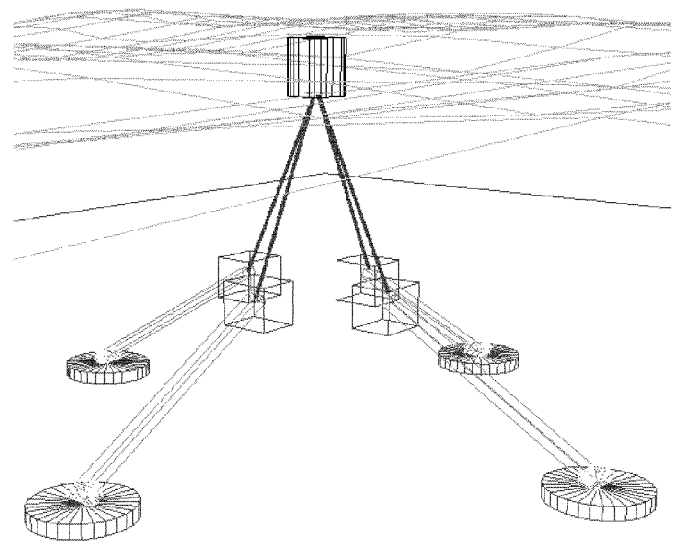
FIG. 10 is a tridimensional view of the same device of FIG. 6, in an embodiment suitable to be installed in shallow water.

In FIG. 10 it is presented an example of installation of more elements according to a structure having a double planimetric symmetry, where each single module is represented by one of the above described devices 100. The global amount of energy generated is proportional to the number of installed modules.

Integration of a System Extracting Thermic Energy

The generation of energy can be achieved according to the two following ways:
- using an electric energy generator, placed close to the hinge, activated by the relative motion of a rotor and a stator; in this case, energy is transferred on shore by electric cables;
- using an hydraulic turbine for electric energy production placed on shore; in this case the turbine works using sea water pushed by a system that is installed off shore; in fact, close to the hinge, the motion between a fixed element and the said rod allows to activate the system pushing the sea water inside a pipeline.

Another embodiment of this invention regards the simultaneous generation of electric energy, and the extraction of thermal energy from the sea water. The sea water, before to be returned to the sea, is pushed on shore and is stored or transported to some heat exchangers, in order to achieve an heating or cooling process through means of heat pumps.

The extraction of thermic energy can be achieved following different ways:
- building a tank, containing sea water and heat exchangers, wherein fresh water circulates in thermal pipelines, able to provide or to take heat for heating or cooling systems for individual users;
- building a tank containing fresh water, that is heated or cooled by sea water through heat exchangers; the tank is connected to thermal pipelines, able to provide or to take heat for heating or cooling systems for individual users;
- building thermal pipelines containing sea water, able to provide or to take heat for heating or cooling systems for individual users.

Therefore, the above examples show that the present invention achieves all the proposed objectives. In particular it allows to obtain a device for conversion of mechanical energy of sea waves to electric energy. Furthermore, the same device has a stable equilibrium point, and the horizontal and vertical oscillations, in respect to the same point, allow to activate an electric power generator.

According to the present invention, the same device can be installed in shallow water or as an alternative in deep water. Again, the device can be part of a modular system that allows to produce an amount of energy proportional to the covered area of sea, or proportional to the number of installed modules.

Finally, the device of the present invention allows the integration of a system for extraction of thermal energy from the sea water, wherein the sea water pushed on shore is stored or transported to heat exchangers before to be returned to the sea, in order to achieve an heating or a cooling process through means including heat pumps. The present invention has been described by way of illustration but not limitation, according to its preferred embodiments, but it is clear that modifications and/or changes can be introduced by those skilled in the art without departing from the relevant scope, as defined in the enclosed claims.

I claim:

1. A device for conversion of mechanical energy of sea waves to electric energy comprising:
   at least a float and two rigid rods, preferably anchored at one end to the seabed, and at the other end to the float through flexible cables; two respective masses, keep the free ends of said rods constantly in traction condition pulled towards the sea bed;
   at least a power generator, or other similar device suitable to convert and/or transmit energy, that is placed close to its respective hinge placed at the bottom parts of rods so that the oscillatory motion of the float following the level of waves causes a force with a vertical component that creates a rotary and oscillatory motion of rods which are pivoted on its respective hinge, and generates therefore electric energy by motion of gears of the same generator; the horizontal component of the force due to the float oscillations is balanced by a system of counterweights, so that the same float tends to place itself constantly on vertical line A-A'.

2. The device of claim 1 for conversion of mechanical energy of sea waves to electric energy, wherein
   a possible motion in horizontal direction X creates a force that tends to return the same float to the starting point; for instance, a motion of the float to the right increases the driving force of both the cable and the left rod, decreasing at the same time the driving force of the respective cable and the right rod, with a consequent effect in X direction that tends to return the rods at their starting equilibrium position in respect on the axis A-A'.

3. The device of claim 1 for conversion of mechanical energy from sea waves to electric energy, wherein:
   the device includes a secondary hinge a' able to make the rod to rotate either on the horizontal plane x-y, so that any transversal action is avoided in connection between the primary hinge and the rod as a consequence of a possible force going along the y direction;

a possible displacement $f_y$ of the float along the direction H-H' causes a further displacement of all the other elements and represents a forces configuration that is not in a stable equilibrium condition, because it increases the intensity of two actions along the line a'-1b, with a resulting effect that an action along y direction tends to return the device to the starting position.

4. The device of claim 1 for conversion of mechanical energy of sea waves to electric energy, and according to installations in shallow water of approximately 10-20 m of depth, wherein:

the position of hinges and is fixed on the seabed, and the fixing elements are suitable to resist to actions trying to move the hinges and closer each other;

the apparatus composed by generator and hinge can lay directly on the seabed, in example using an adaptable trestle, and the position is fixed on the seabed, using system of cables and anchorages, in order to resist to actions that tend to lift it up.

5. The device of claim 1 for conversion of mechanical energy from sea waves to electric energy, according to installations in deep waters of typically more than 20 m of depth, including:

a system of rods and cables suitable to avoid that the two pivots can get closer each other, and the left side get in contact with the right side;

a system of cables for anchorage to the sea bed;

a float, suitable to keep the system at the working level, even when position of mass M reaches a lower level in respect to that of the related pivot and generator; in fact, in such a situation the component of the weight force of the system results to be along the direction down, with the float having a size big enough to support the weight of said generator and pivot, and being capable of being not affected by the dynamic components of the vertical actions.

6. The device of claim 5 for conversion from mechanical energy of sea waves to electric energy, wherein:

the connection between right side and left side of system is given by using rods, anchorage means, and additional floats.

7. The device of claim 1 for conversion of mechanical energy from sea waves to electric energy, including:

a modular system composed of elements, one following the other, where each single module is represented by one of the above described devices, so that the generation of energy is proportional to the sea surface involved by the devices.

8. The device of claim 1 for conversion from mechanical energy of sea waves to electric energy, comprising:

more elements, according to a circular or double symmetry pattern, where each single module is composed of one of the above described devices, so that the amount of generated energy is proportional to the number of installed modules.

9. The device of claim 1 for conversion from mechanical energy of sea waves to electric energy, characterized by generation of energy that can be achieved according to two different ways:

using an electric energy generator, placed close to the hinge, activated by relative motion of a rotor to a stator; in this case, energy is transferred on shore by electric cables; or using an hydraulic turbine for electric energy production placed on shore; in this case the turbine works using sea water pushed by a system that is installed off shore; in fact, at point of the hinge, the motion between a fixed element and the said rod allows to activate the system pushing the sea water inside a pipeline.

10. The device of claim 1 for conversion of mechanical energy from sea waves to electric energy, including means for simultaneous generation of electric energy, and extraction of thermal energy from the sea water, wherein before to be returned to the sea, the sea water is pushed on shore and is stored or transported to heat exchangers in order to achieve an heating or cooling process through means of heat pumps.

\* \* \* \* \*